US008924350B2

(12) United States Patent
Hoprich et al.

(10) Patent No.: US 8,924,350 B2
(45) Date of Patent: *Dec. 30, 2014

(54) SHADOW SYSTEM MIRRORING OF AN ORIGINAL SYSTEM DURING UPTIME OF AN UPGRADE PROCESS

(71) Applicants: Wieland Hoprich, Mannheim (DE); Andrey Engelko, Karlsruhe (DE)

(72) Inventors: Wieland Hoprich, Mannheim (DE); Andrey Engelko, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,221

(22) Filed: Jun. 27, 2013

(65) Prior Publication Data

US 2013/0290259 A1    Oct. 31, 2013

Related U.S. Application Data

(63) Continuation of application No. 12/979,172, filed on Dec. 27, 2010, now Pat. No. 8,527,471.

(51) Int. Cl.
*G06F 17/00* (2006.01)
*G06F 17/30* (2006.01)

(52) U.S. Cl.
CPC .... *G06F 17/30292* (2013.01); *G06F 17/30289* (2013.01)
USPC ......................................................... 707/634

(58) Field of Classification Search
CPC ................ G06F 17/30575; G06F 11/30289; G06F 11/30292
USPC ........................................ 707/634; 717/168
See application file for complete search history.

(56) References Cited

U.S. PATENT DOCUMENTS

| | | | |
|---|---|---|---|
| 6,105,025 A | 8/2000 | Jacobs et al. |
| 6,151,608 A | 11/2000 | Abrams |
| 6,385,770 B1 | 5/2002 | Sinander |
| 6,711,560 B2 | 3/2004 | Levy et al. |
| 6,721,725 B2 | 4/2004 | Levy et al. |
| 6,999,977 B1 | 2/2006 | Norcott et al. |
| 7,028,022 B1 | 4/2006 | Lightstone et al. |
| 7,085,831 B2 | 8/2006 | Larkin |
| 7,111,023 B2 | 9/2006 | Norcott |

(Continued)

OTHER PUBLICATIONS

"Openworld 2011—Day 3 Summary", Oracle Apps Blog, Oct. 26, 2011, 3 pages.

(Continued)

*Primary Examiner* — Rehana Perveen
*Assistant Examiner* — Tiffany Thuy Bui
(74) *Attorney, Agent, or Firm* — Brake Hughes Bellermann LLP

(57) ABSTRACT

A computer system includes a shadow system including a shadow program database having a structure defining an upgrade to a structure of an original program database on an original system, and having data defining an upgrade to data of the original program database on the original system. The computer system includes a database replicator configured to perform at least one transfer of data from a portion of the original user database into the structure of the shadow user database during an uptime of the original system and configured to perform a final transfer of data from the portion of the original user database into the structure of the shadow user database during a downtime of the original system, and an upgrade transfer module configured to replace the portion of the original user database with the shadow user database after the final transfer of data has been performed.

17 Claims, 9 Drawing Sheets

(56) References Cited

U.S. PATENT DOCUMENTS

| | | | |
|---|---|---|---|
| 7,236,991 B2 | 6/2007 | Becker et al. | |
| 7,461,097 B2 | 12/2008 | Stahl et al. | |
| 7,523,142 B2 | 4/2009 | Driesen et al. | |
| 7,620,665 B1 | 11/2009 | George et al. | |
| 7,647,354 B2 | 1/2010 | Norcott | |
| 7,657,576 B1 | 2/2010 | Norcott | |
| 7,694,292 B2 | 4/2010 | Mueller et al. | |
| 7,917,475 B2 * | 3/2011 | D'Souza et al. | 707/656 |
| 8,060,713 B1 | 11/2011 | Natanzon | |
| 8,230,416 B2 * | 7/2012 | Ivanov | 717/173 |
| 8,527,471 B2 | 9/2013 | Hoprich et al. | |
| 2002/0143731 A1 | 10/2002 | Levy et al. | |
| 2003/0130985 A1 | 7/2003 | Driesen et al. | |
| 2003/0135478 A1 * | 7/2003 | Marshall et al. | 707/1 |
| 2004/0044997 A1 * | 3/2004 | Talati et al. | 717/170 |
| 2005/0165802 A1 | 7/2005 | Sethi et al. | |
| 2005/0251523 A1 * | 11/2005 | Rajamani et al. | 707/100 |
| 2007/0027934 A1 | 2/2007 | Roehrle et al. | |
| 2007/0180289 A1 * | 8/2007 | Chai et al. | 714/4 |
| 2007/0220065 A1 | 9/2007 | Coyle et al. | |
| 2007/0250542 A1 | 10/2007 | Chan et al. | |
| 2008/0098037 A1 | 4/2008 | Neil et al. | |
| 2008/0098045 A1 | 4/2008 | Radhakrishnan et al. | |
| 2008/0098046 A1 | 4/2008 | Alpern et al. | |
| 2008/0115134 A1 | 5/2008 | Elliott et al. | |
| 2008/0256528 A1 * | 10/2008 | Waitzmann et al. | 717/172 |
| 2008/0294933 A1 | 11/2008 | Nishii et al. | |
| 2009/0077563 A1 | 3/2009 | Thies et al. | |
| 2009/0094236 A1 | 4/2009 | Renkes et al. | |
| 2009/0113413 A1 | 4/2009 | Reinz | |
| 2009/0172655 A1 | 7/2009 | Ivanov | |
| 2009/0307277 A1 | 12/2009 | Grubov et al. | |
| 2010/0088281 A1 | 4/2010 | Driesen et al. | |
| 2010/0211548 A1 * | 8/2010 | Ott et al. | 707/655 |
| 2010/0218196 A1 | 8/2010 | Leung et al. | |
| 2010/0249980 A1 | 9/2010 | Ito | |
| 2010/0318494 A1 | 12/2010 | Val et al. | |
| 2011/0238888 A1 | 9/2011 | Chiu et al. | |
| 2011/0252000 A1 | 10/2011 | Diaconu et al. | |
| 2011/0252426 A1 | 10/2011 | Antani et al. | |
| 2012/0089625 A1 | 4/2012 | Bentzien et al. | |
| 2012/0137297 A1 | 5/2012 | Hoprich | |
| 2012/0166393 A1 | 6/2012 | Hoprich et al. | |
| 2012/0166493 A1 | 6/2012 | Bentzien et al. | |
| 2013/0159247 A1 | 6/2013 | Engelko et al. | |

OTHER PUBLICATIONS

"Oracle Beehive Administrator's Guide Release 1 (1.5)", Part No. E14836-04, Oracle, 2009, 8 pages.

"Oracle Data Guard 11g Data Protection Availablity for Oracle Database", An Oracle Technical White Paper, Oct. 2011, 22 pages.

"Oracle Data Guard Concepts and Administration 11g Release 1 (11.1)", Part No. B28294-03Oracle, 2008, 2 pages.

"Oracle in-Memory Database Cache User's Guide 11g Release 2 (11.2.2)", Part No. E21634-05, Oracle, 2012, 5 pages.

"Triggers", Oracle8iConcepts, Release 2 (8.1.6), Part No. A76965-01, 2000, 23 pages.

"Using Triggers", Oracle9i Application Developer's Guide—Fundamentals Release 2 (9.2), Part No. A96590-01, 2002, 43 pages.

Extended European Search Report for EP Application No. 12005938.1, mailed Feb. 4, 2013, 5 pages.

Hudson, "Slashing Downtimes with Online Patching", Oracle, 2011, 54 pages.

Ray, et al, "Seamless Application Failover with Oracle Data Guard", Oracle, Dec. 2010, 67 pages.

* cited by examiner

SHADOW SYSTEM MIRRORING OF AN ORIGINAL SYSTEM DURING UPTIME OF AN UPGRADE PROCESS

This application is a continuation of U.S. application Ser. No. 12/979,172, filed on Dec. 27, 2010, which has since issued as U.S. Pat. No. 8,527,471, titled "SHADOW SYSTEM MIRRORING OF AN ORIGINAL SYSTEM DURING UPTIME OF AN UPGRADE PROCESS". The subject matter of this earlier filed application is hereby incorporated by reference.

TECHNICAL FIELD

This description relates to upgrading an original system to a target system.

BACKGROUND

Many known techniques for upgrading portions of an original system can cause an undesirable level of downtime within the original system. For example, using many of these known techniques, all (or nearly all) of the databases of an original system may be unavailable to users while the databases are being upgraded, and the upgrading of the databases may necessarily be implemented during a downtime of the entire original system. The duration and impact of the downtime of the original system and/or unavailability of the databases targeted for upgrade can be aggravated by computationally expensive and/or time-consuming commands used to modify the databases of the original system into an upgraded form. Thus, a need exists for systems, methods, and apparatus to address the shortfalls of present technology and to provide other new and innovative features.

SUMMARY

In one general aspect, a computer system can include instructions stored on a non-transitory computer-readable storage medium. The computer system can include a program database module configured to define, at a shadow system, a shadow program database having a structure defining an upgrade to a structure of an original program database on an original system, and having data defining an upgrade to data of the original program database on the original system. The computer system can include a customization upgrade module configured to select the data of the shadow program database based on a data customization implemented in the original program database of the original system, and configured to define an upgraded program state of the shadow program database based on a combination of the structure of the shadow program database and the data of the shadow program database. The computer system can include a database comparator configured to identify a first portion of an original user database of the original system for upgrade, and configured to identify a second portion of the original user database of the original system for aliasing in the shadow system and can include a user database module configured to define, at the shadow system, a shadow user database having a structure defining an upgrade to a structure of the first portion of the original user database.

In another general aspect, a method can include executing instructions recorded on a non-transitory computer-readable storage media using at least one processor. The method can include defining, at a shadow system, a shadow program database having a structure defining an upgrade to a structure of an original program database on an original system, and having data defining an upgrade to data of the original program database on the original system, and can include selecting the data of the shadow program database based on a data customization implemented in the original program database of the original system. The method can include defining an upgraded program state of the shadow program database based on a combination of the structure of the shadow program database and the data of the shadow program database, and can include identifying a first portion of an original user database of the original system for upgrade. The method can also include identifying a second portion of the original user database of the original system for aliasing in the shadow system, and can include defining, at the shadow system, a shadow user database having a structure representing an upgrade to a structure of the first portion of the original user database.

In yet another general aspect, a non-transitory computer-readable storage medium can store code representing instructions that when executed are configured to cause a processor to perform a process. The code can include code to define, at a shadow system, a shadow program database having a structure defining an upgrade to a structure of an original program database on an original system, and having data defining an upgrade to data of the original program database on the original system, and code to select the data of the shadow program database based on a data customization implemented in the original program database of the original system. The code can include code to define an upgraded program state of the shadow program database based on a combination of the structure of the shadow program database and the data of the shadow program database, and code to identify a first portion of an original user database of the original system for upgrade. The code can also include code to identify a second portion of the original user database of the original system for aliasing in the shadow system, and code to define, at the shadow system, a shadow user database having a structure representing an upgrade to a structure of the first portion of the original user database.

The details of one or more implementations are set forth in the accompanying drawings and the description below. Other features will be apparent from the description and drawings, and from the claims.

DETAILED DESCRIPTION

Figure 1:
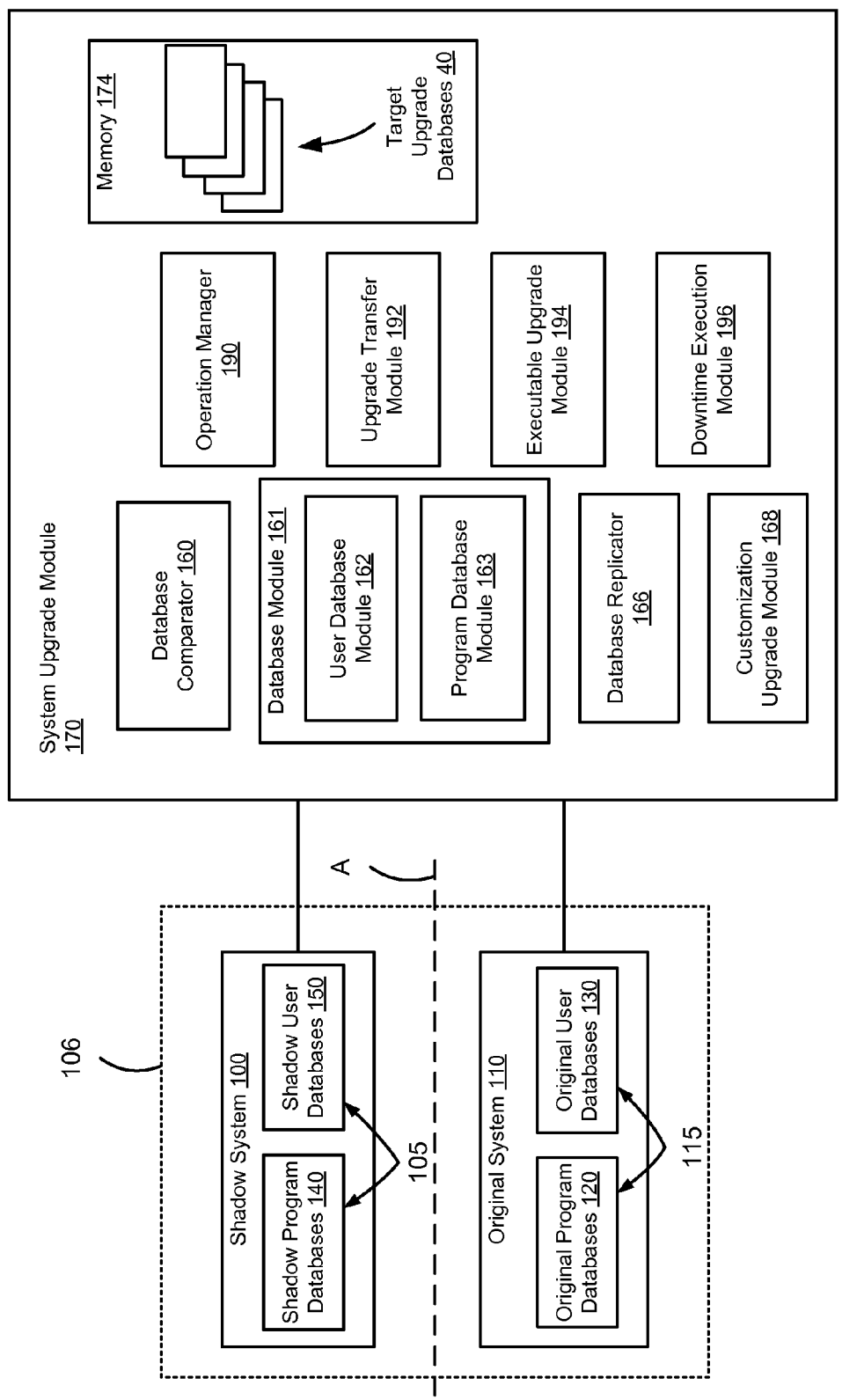
FIG. 1 is a block diagram that illustrates a system upgrade module configured to facilitate an upgrade of an original system using a shadow system.

FIG. 1 is a block diagram that illustrates a system upgrade module 170 configured to facilitate an upgrade of an original system 110 using a shadow system 100. The shadow system 100 is an environment within which certain operations of an upgrade process can be performed so that the original system 110 can operate in an active mode (e.g., remain in an upstate, continue in a normal operational environment) during the upgrade process. Specifically, the shadow system 100 can include one or more portions (e.g., databases, executable files) that correspond with portions (e.g., databases, executable files) of the original system 110. The portions of the shadow system 100 that correspond with the portions of the original system 110 can be referred to as corresponding portions. In some embodiments, the portions of the shadow system 100 that correspond with the portions of the original system 110 can be upgraded versions (e.g., modified versions) or exact copies of the portions of the original system 110. Portions of the upgrade process of the original system 110 can be performed on the corresponding portion(s) of the shadow system 100 while the original system 110 operates in an active mode. The corresponding portions of the shadow system 100, after being upgraded, can later be copied into (and replace portions of) the original system 110. In some embodiments, the original system 110 can be a stand-alone device and/or module, a server, a network, a data center, a software and/or hardware system, a virtual system, a system (e.g., an SAP system) defined based on Advanced Business Application Programming (ABAP), and/or so forth.

By performing certain portions of the upgrade process on the shadow system 100 rather than directly on the original system 110, the downtime of the original system 110 can be lower than if certain portions of the upgrade process are performed directly on the original system 110. In some embodiments, the downtime of the original system 110 during an upgrade process can be minimized by performing certain portions of the upgrade process in the shadow system 100. In some embodiments, the shadow system 100 can be referred to as a shadow system because portions of the shadow system 100 can mirror (or shadow) certain portions of the original system 110.

Throughout this detailed description the terms up/upstate and down/downstate will be used to describe a functional state of a system (e.g., the shadow system 100, the original system 110), while the terms uptime and downtime will be used to describe the accessibility of the system by one or more users (while in a functional state). Thus, a system can only be operating during uptime (and be accessible by a typical user) when the system is also up (e.g., in an upstate), but a system can have downtime (and may not be accessible by a typical user) when the system is also up (e.g., in an upstate).

In some embodiments, the shadow system 100 can be defined specifically for use during the upgrade process. Specifically, the shadow system 100 can be a temporary system created for use during upgrade of the original system 110. After the original system 110 has been upgraded, the shadow system 100 and/or logs associated with the shadow system 100 can be dismantled and/or expunged.

As shown in FIG. 1, the shadow system 100 and the original system 110 are both configured to operate within a common set of hardware 106 (e.g., a common set of servers, a common network) and in a common environment (e.g., a common platform), but are operating within different partitions. The partition within which the shadow system 100 is operating is separated from the partition within which the original system 110 is operating as depicted by line A. In some embodiments, the shadow system 100 and original system 110 may not be operating in different partitions. Although not shown, in some embodiments, portions of the shadow system 100 and/or portions of the original system 110 can be defined so that they operate within different sets of hardware and/or in different environments. In some embodiments, the shadow system 100 can be implemented as a virtual system (e.g., as a virtual machine).

As shown in FIG. 1, the original system 110 includes original program databases 120 and original user databases 130 that can collectively be referred to as original databases 115 of the original system 110. The original user databases 130 can include data defined by the owner of the original system 110. For example, the original user databases 130 can include user-specific data such as business data, financial data, and/or so forth. In some embodiments, the data stored within the original user databases 130 can be referred to as customer data. In some embodiments, the original user databases 130 can be referred to as customer databases. In some embodiments, the original user databases 130 can include, or can be, more than one database. The original program databases 120 can include, or can be, for example, data (e.g., configuration data) associated with a program of the original system 110. In some embodiments, the data stored within the original program databases 120 can be referred to as system data. If the original system 110 is an ABAP-based SAP system, the original program databases 120 can be ABAP repository tables.

Although not shown in FIG. 1, the original program databases 120 can be associated with executable files (e.g., a set of executable files). The original program databases 120 associated executable files can collectively define at least a portion of an original program (not shown). In some embodiments, the executable files can define at least a portion of the kernel associated with an operating system of the original system 110. In other words, in some embodiments, the original program can include a database component (i.e., the original program databases 120) and an executable file component (not shown). Thus, the original program databases 120 can be associated with one or more executable files. In some embodiments, the original program databases 120 can include, or can be, for example, configuration data associated with the executable files. In some embodiments, configuration data can include program instructions associated with the executable files. In other words, the original program databases 120 can describe, or can include, data associated with the functionality of the executable files.

In some embodiments, the executable files and/or the original program databases 120 can collectively be configured to operate on the original user databases 130. In other words, the executable files and/or the original program databases 130 can have functionality related to the original user databases 130.

In some of the embodiments discussed herein, the programs (e.g., the original program, the shadow program) have a database component and an executable file component. In some embodiments, one or more of the programs may only have an executable file component or a database component. For example, a program may only have an executable file component and configuration data (e.g., program instructions) associated with the executable file component can be integrated within the executable file component.

The databases and/or programs described herein can be defined based on a structure, and the structure can include data. In other words, the databases and/or programs described herein can have a structural component and a data component. The structural component can be associated with the data component, and vice versa. The structure of a database (such as the original program databases 120 and/or the original user databases 130) can be defined by rows and/or columns. The data stored in the database can be divided into fields by the structure of the database. For example, a field of a database can be at an intersection of a row of the database and at a column of the database, and can include a portion of data. In some embodiments, the one or more of the databases described herein can be, for example, an Oracle database, a DB2 database, and/or so forth. In some embodiments, the databases discussed herein can be referred to as repositories.

In some embodiments, a database that includes many databases can be referred to in a singular fashion as a database. In some embodiments, individual databases within a database can be referred to as portions of the database. More details related to the structure and/or data in databases and/or programs are described below.

The system upgrade module 170 includes a database comparator 160 configured to identify whether or not at least a portion of a database component of the original program databases 120 and/or at least a portion of the original user databases 130 are to be upgraded. The database comparator 160 can be configured to identify whether or not at least a portion of a database component of the original program databases 120 and/or at least a portion of the original user databases 130 are to be upgraded based on a comparison of the database component of the original program databases 120 and/or the original user databases 130 with at least one target upgrade database from the target upgrade databases 40 stored in a memory 174.

The upgrade of a database from the original system 110 (e.g., the original user databases 130, a database component of the original program databases 120) can include modifying (or not modifying) the structure and/or data of at least a portion of the database from the original system 110 so that the structure and/or data of the at least the portion of the database from the original system 110 matches (e.g., substantially corresponds with) the structure and/or data of at least one target upgrade database from target upgrade databases 40 stored in the memory 174 of the system upgrade module 170. In other words, the upgrade of the original user databases 130 can include modifying at least a portion of the original user databases 130 so that original user databases 130 can have the same form (i.e., structure) and/or substance (i.e., data) of at least one of the target upgrade databases 40. The upgrade of the database component of the original program databases 120 can include modifying at least a portion of the database component of the original program databases 120 so that the database component of the original program databases 120 can have the same form (i.e., structure) and/or substance (i.e., data) of at least one of the target upgrade databases 40.

The target upgrade databases 40 can represent the target upgrade structure and/or target upgrade data of one or more databases from the original system 110. In some embodiments, only a structure of a database from the original system 110 may be upgraded, or only data of a database from the original system 110 may be upgraded. For example, the structure of the original user databases 130 may be upgraded or only the data of the original user databases 130 may upgraded.

As shown in FIG. 1, the system upgrade module 170 includes a database module 161 configured to define shadow databases 105 of the shadow system 100. The database module 161 includes a user database module 162 configured to define, at the shadow system 100, shadow user databases 150 having at least a portion of a structure and/or a portion of data that is an upgrade to (e.g., a modification of) at least a portion of a structure and/or a portion of data of the original user databases 130 of the original system 110. The shadow user databases 150 can be defined at the shadow system 100 in response to the database comparator 160 identifying the original user databases 130 of the original system 110 for upgrade. In other words, the user database module 162 can be configured to define the shadow user databases 150 at the shadow system 100 that correspond to the original user databases 130 of the original system 110 (or portion(s) thereof) when the original user databases 130 of the original system 110 (or portion(s) thereof) are identified for upgrade.

The database module 161 also includes a program database module 163 configured to define, at the shadow system 100, shadow program databases 140 having at least a portion of a structure and/or a portion of data that is an upgrade to (e.g., a modification of) at least a portion of a structure and/or a portion of data of the original program databases 120 of the original system 110. The shadow program databases 140 can be defined at the shadow system 100 in response to the database comparator 160 identifying the original program databases 120 of the original system 110 for upgrade. In other words, the program database module 163 can be configured to define the shadow program databases 140 at the shadow system 100 that correspond to the original program databases 120 of the original system 110 (or portion(s) thereof) when the original program databases 120 of the original system 110 (or portion(s) thereof) are identified for upgrade.

The database module 161 (e.g., the user database module 162 and/or the program database module 163) can be configured to manipulate one or more portions of the shadow databases 105 during an upgrade process. By performing certain portions of the upgrade process of the original system 110 using the system upgrade module 170 (e.g., the database module 161 of the system upgrade module 170) on the shadow databases 105 of the shadow system 100, the downtime of the original system 110 can be lower than (e.g., minimized) if a certain portions of the upgrade process are performed directly on the original databases 115 of the original system 110.

In some embodiments, the database comparator 160 can be configured to determine that one or more of the original program database 120 (and/or a portion thereof) and/or one or more of the original user databases 130 (and/or a portion thereof) should not be upgraded. Specifically, the database comparator 160 can be configured to identify one or more of the original databases 115 (and/or a portion thereof) that should not be upgraded based on a comparison with the target upgrade databases 40. More details related to a comparator, and the functions thereof, are described in connection with, for example, FIG. 4 (which includes FIGS. 4A through 4F).

In some embodiments, one or more original databases from the original databases 115 (and/or portions thereof) that have been identified for no upgrade can be referred to as non-modified original databases (not shown in FIG. 1). The non-modified original database(s) from the original databases 130 can be referenced in (e.g., linked within) the shadow system 100. In some embodiments, referencing of portions of the non-modified originals database(s) in the shadow system 100 can be referred to as aliasing. After these non-modified original database(s) have been replicated in the shadow system 100, these non-modified original databases may not be manipulated within the shadow system 100 during the upgrade process (because they have been identified as not being subject to an upgrade).

As shown in FIG. 1, the system upgrade module 170 includes a database replicator 166. In some embodiments, the non-modified original databases may be replicated within the shadow system 100 by the database replicator 166. In some embodiments, the non-modified original databases may be replicated within the shadow system 100 as one or more alias databases of the shadow system 100 (not shown). More details related to database replication of non-modified original databases (or portions thereof) are described in connection with, for example, FIG. 4.

As shown in FIG. 1, the system upgrade module 170 includes a customization upgrade module 168. The customization upgrade module 168 is configured to modify one or more portions (e.g., a data portion, a structure portion) of the shadow program databases 140 at the shadow system 100 based on one or more customizations implemented within the original program databases 120. For example, one or more of the original program databases 120 may have a customized configuration implemented by a user of the original system 110. In some embodiments, the customizations can be based on one or more support packages associated with an original program associated with the original program databases 120. These customized configuration(s) can be used to modify the shadow program databases 140 at the shadow system 100. More details related to modification of a shadow program database based on customizations to an original program database are discussed in connection with, for example, FIGS. 2 through 4.

The system upgrade module 170 includes an upgrade transfer module 192 configured to replace the original databases 115 with the shadow databases 105 after manipulation of the shadow databases 105 has been completed during an upgrade process. In some embodiments, the upgrade transfer module 192 is configured to dismantle (e.g., remove, disabled) the shadow system 100 included in the set of hardware 106. After the shadow system 100 has been dismantled, the original databases 115 can be replaced with the shadow databases 105 (which continue to exist after the shadow system 100 has been dismantled). In some embodiments, the upgrade transfer module 192 can be configured to perform at least some of its functions during a downtime of the original system 110. More details related to replacement of the original databases and related to removal of at least some portions of a shadow system are discussed at least in connection with FIG. 4.

As shown in FIG. 1, the system upgrade module 170 includes an executable upgrade module 194. The executable upgrade module 194 is configured to handle an upgrade of one or more executable files (not shown) associated with the original system 110. In some embodiments, the executable files can define a program configured to operate on the original user databases 130.

The system upgrade module 170 can include a downtime execution module 196 configured to manage a downstate and/or an upstate of the shadow system 100 and/or a downtime and/or an uptime of the original system 110 during the upgrade process. During downtime, the original system 110 may be in a downstate or an upstate, and during the uptime, the original system 110 will be in an upstate. For example, the downtime execution module 196 can be configured to change the shadow system 100 from an upstate to a downstate during a portion of the upgrade process. Similarly, the downtime execution module 196 can be configured to change the original system 110 from uptime to a downtime during a portion of the upgrade process.

During downtime of the original system 110, one or more portions of the original system 110 may not accessible by a typical user. However, the shadow system 100 and/or the original system 110 may be accessible by, for example, an administrator when the shadow system 100 is in a downstate and/or during downtime of the original system 110. For example, when the original system 110 is in a downstate during downtime of the original system 110, data from the original user databases 130 of the original system 110 may not be accessed by a user of the original system 110. Instead, the original user databases 130 may be locked so that data cannot be retrieved from and/or stored to the original user databases 130.

During uptime of the original system 110, one or more portions of the original system 110 may be accessible by a typical user in a typical operational mode. In other words, the original system 110 may be actively used during uptime. For example, when the original system 110 is in an upstate during uptime of the original system 110, data from the original user databases 130 of the original system 110 may accessed (e.g., modified) by a user of the original system 110.

In some embodiments, the downtime execution module 196 can be configured to suspend one or more batch jobs of the original system 110 when (e.g., before) a downtime of the original system 110 is initiated. In some embodiments, the downtime execution module 196 can be configured to log-off one or more user from the original system 110 before a downtime of the original system 110 is initiated.

Portions (e.g., steps) of an upgrade process can be performed when the shadow system 100 and/or the original system 110 are in an upstate or in a downstate. In other words, portions of the upgrade process can be performed during various portions of the upstate or downstate of the upgrade of the shadow system 100 and/or the original system 110. Examples related to an upgrade process are described in more detail in connection with the figures below.

The system upgrade module 170 can be, or can be included within, for example, a client device and/or a server device. In some embodiments, the system upgrade module 170 can be, or can be included within, for example, a wired device and/or a wireless device (e.g., wi-fi enabled device) and can be, for example, a computing entity (e.g., a personal computing device), a mobile phone, a personal digital assistant (PDA) and/or so forth. The system upgrade module 170 can be configured to operate based on one or more platforms (e.g., one or more similar or different platforms) that can include one or more types of hardware, software, firmware, operating systems, runtime libraries, and/or so forth. In some embodiments, the system upgrade module 170 can be defined using ABAP and/or can be related to a NetWeaver platform.

Although not shown, in some embodiments, the memory 174 can be implemented as more than one memory component (e.g., more than one random-access memory (RAM) component or disk drive memory) within the system upgrade module 170. In some embodiments, the memory 174 can be, or can include, a non-local memory (e.g., a memory not physically included within the system upgrade module 170) within a network (not shown). For example, the memory 174 can be, or can include, a memory shared by multiple system upgrade modules (not shown) within a network.

Although not shown, the system upgrade module 170 can be configured to operate within an environment that includes an operating system. In some embodiments, the operating system can be configured to facilitate the functions of the system upgrade module 170.

In some embodiments, the system upgrade module 170 can represent, or can be included within, a cluster of modules/devices. In such an embodiment, the functionality and processing of the system upgrade module 170 (e.g., the database module 162 of the system upgrade module 170) can be distributed to several modules/devices of the cluster of modules/devices.

In some embodiments, one or more portions of the components shown in the system upgrade module 170 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the database module 162 can be, or can include, a software module configured for execution by at least one processor (not shown). In some embodiments, the functionality of the components can be included in different modules and/or components than those shown in FIG. 1. For example, although not shown, the functionality of the database comparator 160 can be included in a different module than the database comparator 160, or divided into several different modules (not shown).

In some embodiments, the system upgrade module 170, the shadow system 100, and/or the original system 110 can be included within a network that can include multiple devices (e.g., multiple client devices, multiple server devices). For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet. Also, although not shown in FIG. 1, the system upgrade module 170 can be configured to function within various types of network environments.

Figure 2:
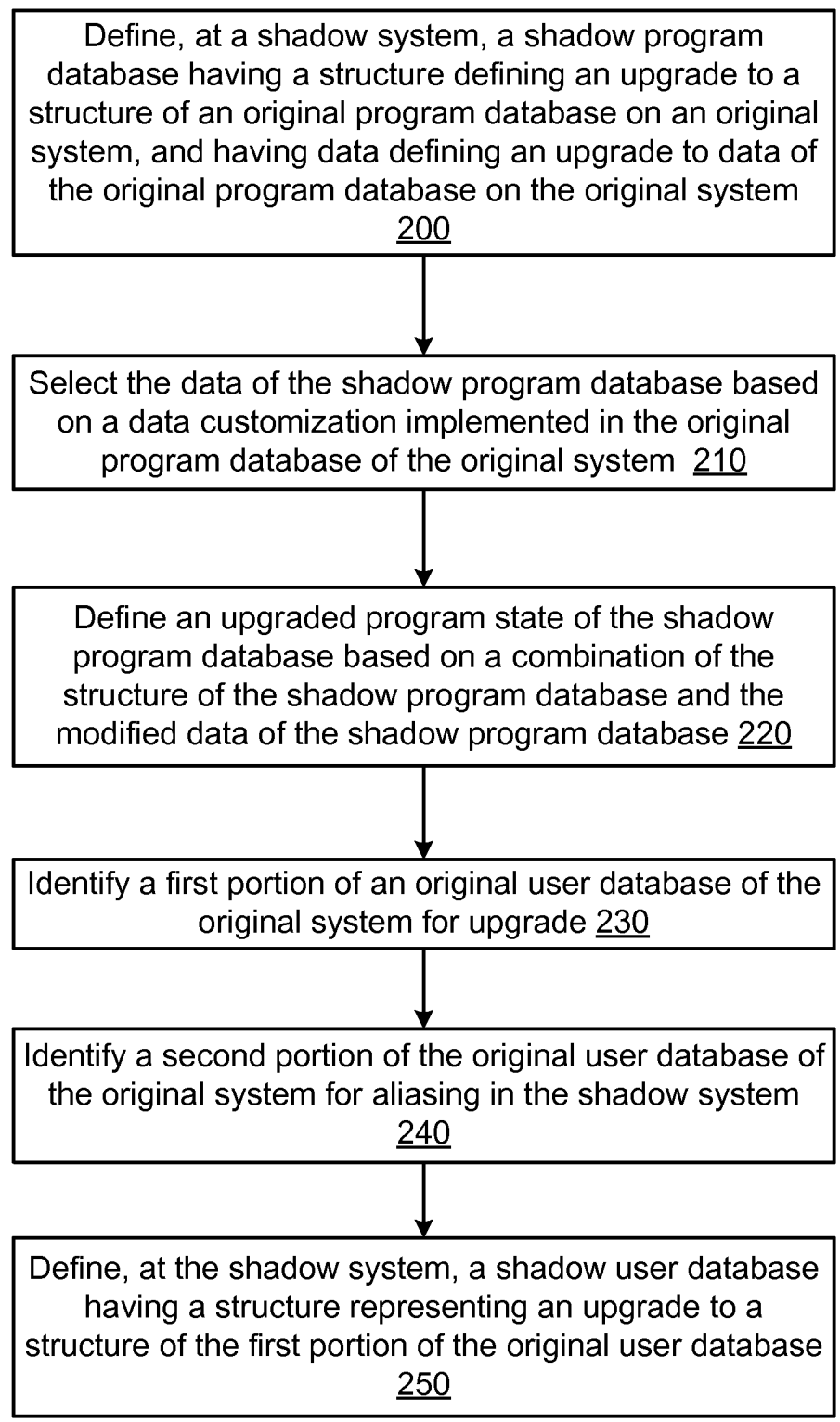
FIG. 2 is a flowchart that illustrates a method for upgrading the original system.

FIG. 2 is a flowchart that illustrates a method for upgrading the original system. In some embodiments, portions of the flowchart can be implemented by, for example a system upgrade module such as the system upgrade module 170 shown in FIG. 1.

As shown in FIG. 2, a shadow program database having a structure defining an upgrade to a structure of an original program database on an original system and having data defining an upgrade to the data of the original program database on the original system is defined at a shadow system (block 200). The original program database can be identified for upgrade by a database comparator, such as database comparator 160 shown in FIG. 1, based on a comparison of the original program database with a target upgrade database. In some embodiments, the original program database can be one of several original program databases identified for upgrade by the database comparator. In some embodiments, the shadow program database can be defined by a program database module such as program database module 163 shown in FIG. 1.

In some embodiments, the shadow system can be implemented within a set of hardware and/or software associated with the original system. In some embodiments, the original program database can be associated with one or more executable files. The original program database and the executable files can collectively define an original program such as a database management program, a financial program, a human resources program, and/or so forth.

The data of the shadow program database is selected based on a data customization implemented in the original program database of the original system (block 210). In some embodiments, the data customization can be associated with a support package of an original program associated with the original program database. In some embodiments, configuration data associated with the support package can be stored in the original program database. In some embodiments, the data customization can be implemented in a customized fashion by a user.

An upgraded program state of the shadow program database is defined based on a combination of the structure of the shadow program database and the data of the shadow program database (block 220). In some embodiments, the shadow program database can represent an upgrade to the original program database. The upgraded program state of the shadow program database can represent a version of the original program database that includes support packages.

For example, a base upgrade version of the original program database can be represented by version 7.1X where the "7.1" represents the program level and the "X" represents that this program level is the base version without customizations based on support packages. Program version 7.1X can be the program version of the shadow program database originally defined within the shadow system. The upgraded program state of the shadow program database, which may be selected based on customizations associated with (or defined by) one or more support packages, can be, for example, program version 7.1QC. The characters "QC" represent the support packages that can be used to define the upgraded program state. In other words, the program level and support packages can collectively define the upgraded program state (or upgraded program version).

Although not shown in FIG. 2, in some embodiments, the structure of the shadow program database, in addition to, or in lieu of the data of the shadow program database, may be modified based on a customization. In some embodiments, a modification to the structure of the shadow program database can be referred to as a structural customization. In some embodiments, the upgrade program state of the shadow program database can be defined by a customization upgrade module such as customization upgrade module 168 shown in FIG. 1.

A first portion of an original user database of the original system is identified for upgrade (block 230). In some embodiments, the original user database can be a collection of original user databases, and the first portion of the original user database can be an individual database within the original user databases. The first portion of the original user database can be identified for upgrade by a database comparator, such as database comparator 160 shown in FIG. 1, based on a comparison of the original user database with a target upgrade database.

A second portion of the original user database of the original system is identified for aliasing in the shadow system (block 240). In some embodiments, the second portion of the original user database can be an individual database within a collection of original user databases represented by the original user database. In some embodiments, the second portion of the original user database may be identified for aliasing (e.g., linking within) because the second portion of the original user database is not to be upgraded during an upgrade process. Accordingly, the second portion of the original user database may be aliasing in the shadow system, and may not be subject to modification. In some embodiments, the second portion of the original user database may be replicated in the shadow system by a database replicator 166 shown in FIG. 1.

A shadow user database having a structure representing an upgrade to a structure of the first portion of the original user database is defined at the shadow system (block 250). In some embodiments, the shadow user database may be defined within the shadow system by a user database module such as user database module 162 shown in FIG. 1.

Figure 3A:
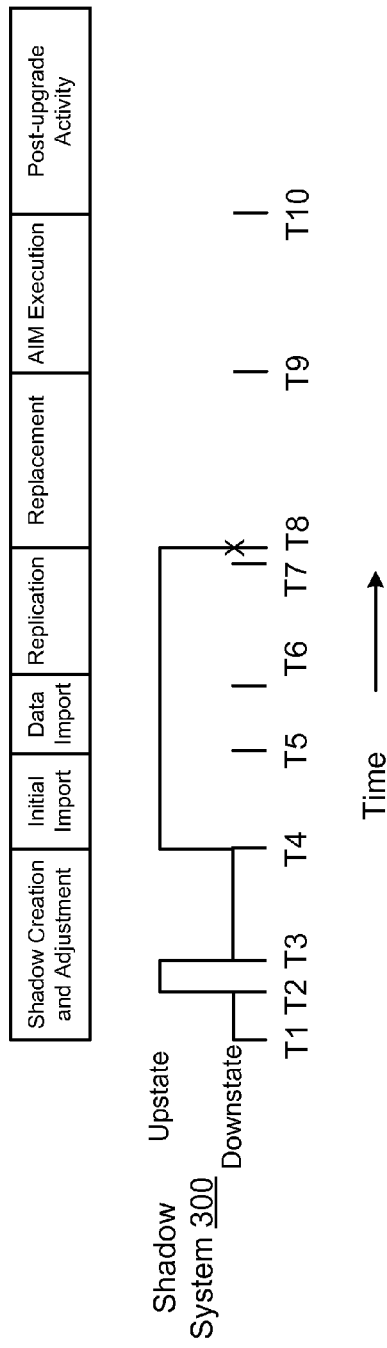
FIG. 3A illustrates upstates and downstates of a shadow system during an upgrade process.
Figure 3B:
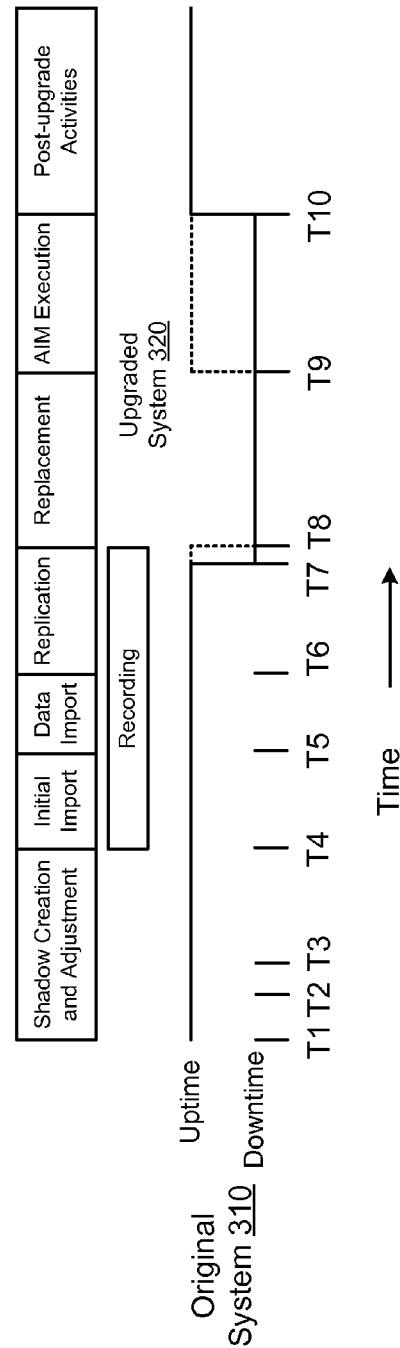
FIG. 3B illustrates uptime and downtime of an original system during the upgrade process.

FIG. 3A illustrates upstates and downstates of a shadow system 300 during an upgrade process. FIG. 3B illustrates uptime and downtime of an original system 310 during the upgrade process. As shown in FIG. 3A and in FIG. 3B, time is increasing to the right. Stages of the upgrade process are shown in both FIGS. 3A and 3B. Specifically the stages of the upgrade process include a shadow creation and adjustment stage, an initial import stage, a data import stage, a replication stage, a replacement stage, an after import method (AIM) execution stage, and a post-upgrade activity stage. Recording is also shown below the initial import stage, the data import stage, and the replication stage. In some embodiments, changes to the original system 310 that are recorded can later be replicated within (e.g., transferred to) the shadow system 300 during the replication stage of the upgrade process. The description associated with FIGS. 3A and 3B includes a brief overview of the operations associated with an upgrade process. A specific example of an upgrade process including more details related to the operations performed during the stages of the upgrade process is described in connection with FIGS. 4A through 4F.

As shown in FIG. 3A and FIG. 3B, the shadow creation and adjustment stage of the upgrade process is started at time T1. As shown in FIG. 3A, the shadow system 300 can be in a downstate during the shadow creation and adjustment stage of the upgrade process. Also as shown in FIG. 3A, the shadow system 300 changes to an upstate between times T2 and T3. As shown in FIG. 3B, the original system 310 can be in uptime (and in an upstate) during the shadow creation and adjustment stage of the upgrade process.

During the shadow creation adjustment stage, a shadow system can be created (e.g., defined), and one or more shadow program databases and/or shadow user databases are defined within the shadow system. In some embodiments, the shadow program database(s) can correspond with one or more original program databases of the original system and/or the shadow user database(s) can correspond with one or more original user databases of the original system.

In some embodiments, the shadow program databases and/or shadow user databases can be defined, at least in part, based on a comparison with one or more upgrade target databases. The comparison can be performed while the shadow system 300 is in the upstate between times T2 and T3. In some embodiments, the shadow program databases can have a default structure and/or data associated with a particular program version that is a target program version of the original system. In some embodiments, the shadow system can also include one or more shadow executable files that are upgrades to (and can correspond with) original executable files included in an original system. In some embodiments, the shadow system can include default data associated with a base version of an upgrade to the original system. In some embodiments, the shadow system can be defined within a set of hardware associated with the original system.

As shown in FIG. 3A, the shadow system 300 can be in an upstate during the initial import, the data import, and the replication stages of the upgrade process (between times T4 through T8). Also, as shown in FIG. 3A, changes to the original system 310 are recorded in the shadow system 300 during the initial import, the data import, and the replication stages of the upgrade process (between times T4 through T8).

As shown in FIG. 3B, the original system 310 can be in uptime (and in an upstate) during the initial import and the data import stages of the upgrade process, and can be in uptime (and in an upstate) during at least a portion (between times T6 and T7) of the replication stage of the upgrade process. The dashed lines shown in FIG. 3B illustrate times during which the original system 310 is in an upstate, but is in downtime. Specifically, the original system 310 can be in downtime (but in an upstate) between times T6 and T7 and between times T9 and T10.

During the initial import stage of the upgrade process, default data that can be included in one or more shadow program databases and/or one or more shadow user databases can be transferred (e.g., initially transferred) from the original system. Specifically, the default data included in the one or more shadow user databases can be imported from the databases of the original system.

As shown in FIG. 3A, starting at time T5 during the data import stage, new data associated with an upgrade can be imported into (and used to modify one or more shadow databases of) the shadow system 300. Also, certain after import methods (AIMs) and/or execution of programs after import (XPRAs) enabled for (and/or designated for) execution within the shadow system can be executed within the shadow system. In some embodiments, if the shadow system is based on ABAP, certain ABAP loads can be generated within the shadow system.

An AIM can be a method (e.g., an executable program) configured to modify one or more databases (e.g., shadow databases 105, user databases 115) so that the database(s) are compatible with, for example, a system upgrade. In some embodiments, an AIM can be configured to produce runtime information, and/or can be configured to generate code that can produce runtime information. In some embodiments, an AIM can be configured to facilitate transport and/or import of one or more of database(s). In some embodiments, an AIM can be configured to operate on multiple databases. For example, in some embodiments, a specific AIM can be configured to produce or make multiple databases compatible with a first platform (e.g., a DB2 platform) based on metadata associated with the multiple databases and/or based on metadata associated with multiple databases compatible with a second platform (e.g., an Oracle platform).

Similar to an AIM, an XPRA can be a method (e.g., an executable program) configured to modify one or more of the databases (e.g., shadow databases 105, user databases 115) so that the database(s) are compatible with, for example, a system upgrade. In some embodiments, an XPRA may not be configured to produce runtime information. In some embodiments, an XPRA can be configured as a single-use method configured to operate on a single database. For example, in some embodiments, an XPRA can be configured to convert data included in a database from a first format (e.g., an original format) associated with a first system (e.g., an original system) to a second format (e.g., a different format) associated with a second system (e.g., an upgraded system). In some embodiments, the XPRA may only be executed once, because after the data and/or structure of the database has been converted from the first format to the second format, the data and/or structure of the database object that is later manipulated by the second system will be compatible with the second system because the second system already functions based on the second format.

As shown in FIGS. 3A and 3B, the replication stage of the upgrade process can be started at time T6. As shown in FIG. 3A, both the shadow system 300 and the original system 310 can be in an upstate (and the original system 310 can be in uptime) during a first portion of the replication stage of the upgrade process starting at time T6. During a second portion of the replication stage of the upgrade process starting at time T7, the original system 310 can be changed from uptime to downtime. The second portion of the replication stage of the upgrade process can be referred to as the final transfer. Accordingly, the final transfer can be between times T7 and T8.

During the first portion of the replication stage of the upgrade process, changes to one or more portions of the original system 310 (some of which can be recorded during recording) can be transferred to one or more portions of the shadow system 300. The changes can be transferred to the shadow system so that the one more portions of the original system can be replicated within the one or more portions of the shadow system. In some embodiments changes to the one or more portions of the original system 310 can be logged within, for example, log data (e.g., a log database). In some embodiments, the replication of recorded changes can be repeated more than once during the replication stage.

During the second portion of the replication stage (or final transfer portion of the recording stage), users may be logged off from the original system, batch jobs can be suspended, and/or remaining (e.g., residual) changes in the original system can be transferred to the shadow system. At the end of the second portion of the replication stage, transfer (i.e., recording) functionality may be turned off.

As shown in FIGS. 3A and 3B, the replacement stage of the upgrade process can be started at time T8. As shown in FIG. 3A, the shadow system 300 can be in a downstate and the original system 310 can also be in a downstate.

During the replacement stage of the upgrade process, the shadow system 300 can be dismantled (and thus does not exist as a functional system) and the remaining portions of the shadow system 300 that are upgrades to the original system 310 can be moved into the original system 310 as an upgraded system 320. In other words, the portions of the shadow system 300 that are upgrades to the original system 310 can replace the portions of the original system 310. Portions of the original system 310 that are not upgraded (i.e., are not subject to upgrade) may not be replaced by portions of the shadow system 300. In this embodiment, at the end of the replacement stage, if remaining portions of the shadow system 300 are within a set of hardware that is common to the original system 310, the remaining portions of the shadow system 300 may be removed from that set of hardware.

As shown in FIGS. 3A and 3B, the AIM execution stage of the upgrade process can be started at time T9. During the AIM execution stage starting at time T9, the upgraded system 320 (which was previously the original system 310 until upgraded) can be in an upstate, but the original system 310 will not be in downtime.

In some embodiments, during the AIM execution stage certain AIMs and/or XPRAs that were not enabled (and/or designated) for execution within the shadow system 300 during, for example, the data import stage can be executed within the upgraded system 320 during the AIM execution stage.

As shown in FIGS. 3A and 3B, the post-upgrade activity stage of the upgrade process can be started at time T10. At the start of the post-upgrade activity stage, the upgraded system 320 (which was previously the original system 310 until upgraded) can be changed from downtime (in an upstate) to uptime (in an upstate).

During the post-upgrade activity stage, the upgraded system 320 can be unlocked for use by one or more users and batch jobs or previously suspended during the recording stage can be restarted by, for example, an administrator. In some embodiments, after the AIM execution stage of the upgrade process has been completed, an administrator can be notified that post-upgrade activities may be initiated.

Although the stages shown in FIG. 3A and in FIG. 3B are shown as discrete stages of an upgrade process, in some embodiments one or more of the stages may overlap with another stage of the upgrade process. In some embodiments, the stages (or functions thereof) described in connection with FIGS. 3A and 3B may be performed in a different order than that shown in FIGS. 3A and 3B. For example, in some embodiments, the data import stage can be performed before the initial import stage. In such embodiments, recording can be initiated after the data import stage has been initiated. In some embodiments, the relative sizes of each of boxes associated with the stages shown in FIGS. 3A and 3B may not be representative of the relative durations of the respective stages.

FIG. 4, which includes FIGS. 4A through 4F, is a collection of diagrams that illustrate stages of an upgrade process of an original system 410 using a shadow system 400. In these diagrams, the shadow system 400 is shown on the left and the original system 410 is shown on the right. In some embodiments, one or more portions of the upgrade process can be implemented using a system upgrade module, such as system upgrade module 170 shown in FIG. 1.

Figure 4A:
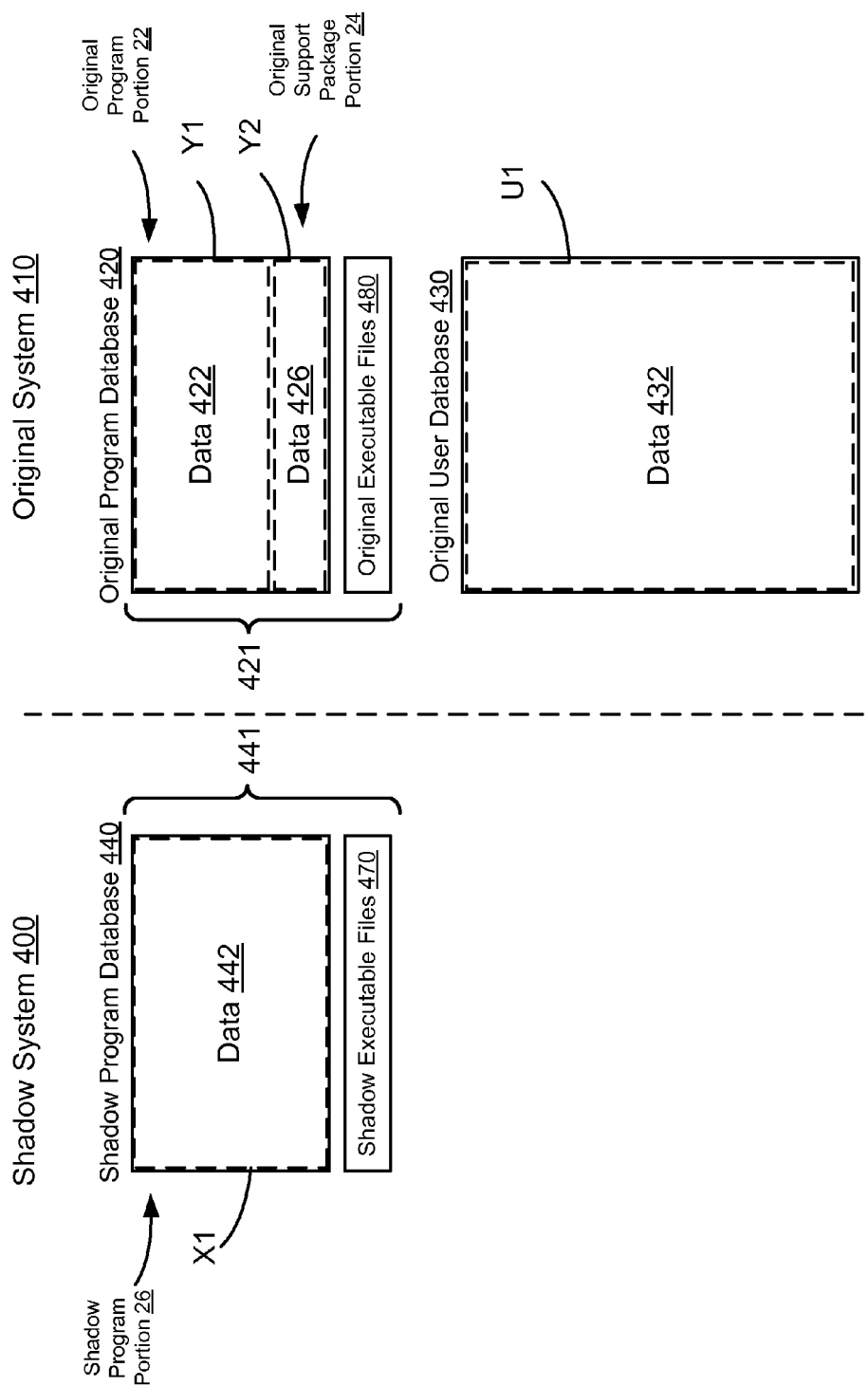
FIG. 4A is a diagram that illustrates a shadow program database and shadow executable files defined within a shadow system.

FIG. 4A is a diagram that illustrates a shadow program database 440 and shadow executable files 470 defined within a shadow system 400. As shown in FIG. 4A, the shadow program database 440 and shadow executable files 470 collectively define a shadow program 441. Also, as shown in FIG. 4A, an original program 421 (which corresponds with the shadow program 441) includes an original program database 420 and original executable files 480, which collectively define the original program 421. The shadow program 441 can be an upgrade to the original program 421 included in the original system 410. In some embodiments, the shadow program 441 can be a base version of an upgrade to the original program 421. Thus, the shadow executable files 470 can represent upgraded executable files of the original executable files 480. In some embodiments, the portion of the upgrade process depicted in connection with FIG. 4A can be part of a shadow creation and adjustment stage of the upgrade process.

The original program database 420 can be referred to as a database component of the original program 421. The original program database 420 includes a structure Y1 represented by a dashed line and data 422 that is stored within the structure Y1. The original program database 420 also includes a structure Y2 represented by a dashed line and data 426 that is stored within the structure Y2.

The structure Y1 and data 422 collectively define (or are associated with) an original program level that can be referred to as an original program portion 22 of the original program database 420, and the structure Y2 and data 426 collectively define (or are associated with) customizations associated with one or more support packages (also can be referred to as enhancement packages) associated with the program level is referred to as an original support package portion 24 of the original program database 420. In some embodiments, the shadow program database 440 can be defined by a program database module such as program database module 163 shown in FIG. 1.

For example, the original program 421 can be program version 2.0 SPG2, which can be defined by a program level (which corresponds with the original program portion 22) and customizations based on support packages (which corresponds with the original support package portion 24). In this embodiment, the characters "2.0" represent a particular program level, and the characters "SPG2" represent customizations to the program level 2.0 based on support packages. In some embodiments, the customizations may be chosen from a library of potential support packages that can be associated with a particular program level. Accordingly, the customizations can depend on configurations of particular support packages implemented by a user with respect to the particular program level.

As shown in FIG. 4A, the shadow program database 440 includes a structure X1 represented by a dashed line and data 442 that is stored within the structure X1 (both of which are part of the shadow program 441). Data 442 that is stored within the structure X1 can, in some embodiments, be upgrades corresponding with data 422 and data 426 of the original program 421. The structure X1 and data 442 collectively define a shadow program level that can be referred to as a shadow program portion 26 of the shadow program database 440.

In this embodiment, the upgrade to the original program 421 (which is the shadow program portion 26 of the shadow program database 440) is represented as program version 6.0 SPG2. In this embodiment, the characters "6.0" represent a particular program level (i.e., the upgraded program level), and the characters "SPG2" represent the customizations based on support packages that correspond with the support packages SPG2 of the original program 421. At this point in the upgrade process, the data 442 included in the structure X1 of the shadow program database 440 (which collectively define the shadow program portion 26 of the shadow program database 440) corresponds with the original program 421.

Although not shown in FIG. 4A, in some embodiments, the original program database 420 may not include customizations based on support packages. Accordingly, such customizations may not be included as part of an upgrade process.

As shown in FIG. 4A, the shadow program database 440 corresponds with the original program database 420, albeit the shadow program database 440 is an upgraded version of the original program database 420. Similarly, the shadow executable files 470 correspond with the original executable files 480, albeit the shadow executable files 470 are an upgraded version of the original executable files 480.

Although not shown in FIG. 4A, in some embodiments, the shadow system 400 and the original system 410 can be configured to operate within a common system, such as a data center, a server farm, and/or so forth. In some embodiments, if the shadow system 400 is a software system, the shadow system 400 can be created using an installation from, for example, a memory (e.g., a hard drive), a computer-readable medium (e.g., a digital versatile disc (DVD)), and/or so forth.

The original program 421 is configured to operate on an original user database 430. The original user database 430 has a structure U1 represented by a dashed line, and data 432 stored within the structure U1. In some embodiments, the original user database 430 can be, or can include, for example, various types of customer data.

In some embodiments, when the shadow system 400 is created, the shadow system 400 can be in an upstate. In some embodiments, the shadow system 400 can be configured to start-up on and/or operate based on the program level 6.0 and/or the program level 6.0 SPG2. Because the shadow system 400 is a temporary system created for use during an upgrade process of the original system 410, the shadow system 400 may not be accessible by users of the original system 410. Also, the original system 410 can be in an upstate (and in uptime) when the shadow system 400 is created and can be in productive use by one or more users. In other words, the original system 410 can be accessible and used in a typical operational mode while the shadow system 400 is being created. In some embodiments, the original system 410 can be changed from an upstate to a downstate during the portions of the upgrade process described in connection with FIG. 4A.

Figure 4B:
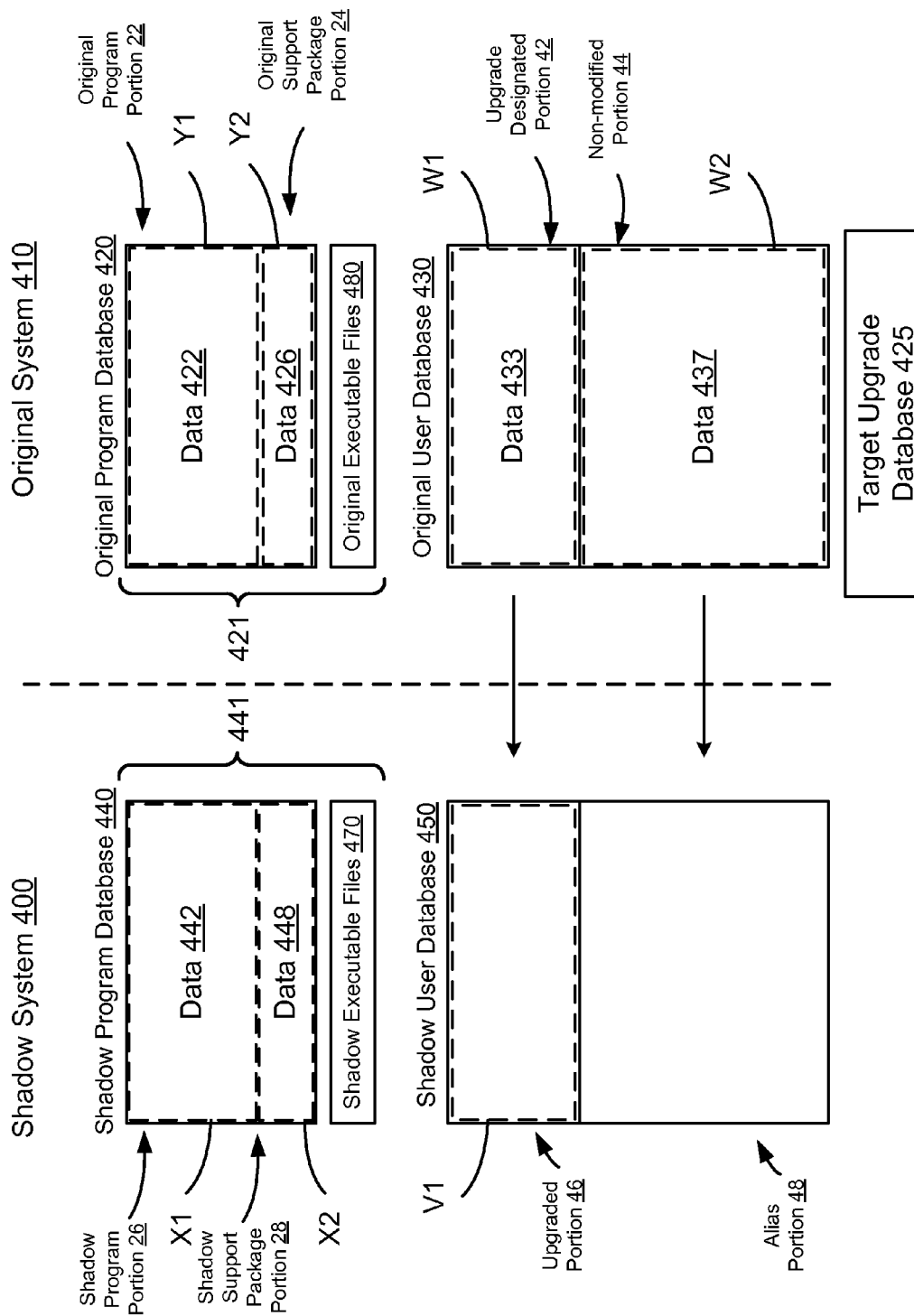
FIG. 4B is a diagram that illustrates creation of a shadow user database within the shadow system shown in FIG. 4A.

FIG. 4B is a diagram that illustrates creation of a shadow user database 450 within the shadow system 400 shown in FIG. 4A. The shadow user database 450 has a structure V1 that corresponds with an upgrade designated portion 42 of the original user database 430 that has been identified as a portion of the original user database 430 to be upgraded. The shadow user database 450 also includes an alias portion 48 that corresponds with a non-modified portion 44 of the original user database 430 that has been identified as a portion of the original user database 430 that should not be modified (and will be aliased). In some embodiments, the shadow user database 450 can be defined by a user database module such as user database module 162 shown in FIG. 1. In some embodiments, the portion of the upgrade process depicted in connection with FIG. 4B can be part of the shadow creation and adjustment stage of the upgrade process.

As shown in FIG. 4B, the upgrade designated portion 42 includes a structure W1 and data 433 stored within the structure W1. The upgrade designated portion 42 is identified as a portion of the original user database 430 that should be upgraded based on a comparison of the original user database 430 with a target upgrade database 425. Although not shown in FIG. 4B, in some embodiments the target upgrade database 425 can include multiple target upgrade databases. The target upgrade database 425 can represent a target upgrade structure and/or data of the original user database 430. In some embodiments, the comparison of the original user database 430 with a target upgrade database 425 can be performed by a database comparator such as database comparator 160 shown in FIG. 1.

The structure V1 is a structure that represents an upgrade to the structure W1 and can be referred to as an upgraded structure. In the embodiment shown in FIG. 4B, the structure V1 of the shadow user database 450 does not include any data when the structure V1 of the shadow user database 450 is defined. In other words, the structure V1 is an empty upgraded structure defined within the shadow user database 450. In some embodiments, the portion of the shadow user database 450 corresponding with the upgrade designated portion 42 of the original user database 430 can be referred to as an upgraded portion 46 of the shadow user database 450. Because the upgraded portion 46 of the shadow user database 450 is defined in response to the upgrade designated portion 42 being identified based on a comparison of the original user database 430 with the target upgrade database 425, the upgraded portion 46 of the shadow user database 450 can be referred to as being defined in response to the comparison of the original user database 430 with the target upgrade database 425.

As shown in FIG. 4B, the non-modified portion 44 includes a structure W2 and data 437 stored within the structure W2. The non-modified portion 44 is identified as a portion of the original user database 430 that should not be modified based on a comparison of the original user database 430 with the target upgrade database 425. In other words, the non-modified portion 44 is identified as a portion of the original user database 430 that is not to be modified during the upgrade process and will instead be aliased.

As mentioned above, in some embodiments, the portion of the shadow user database 450 corresponding with the non-modified portion 44 of the original user database 430 can be referred to as the alias portion 48 of the shadow user database 450. Because the alias portion 48 of the shadow user database 450 is defined in response to the non-modified portion 44 being identified based on a comparison of the original user database 430 with the target upgrade database 425, the alias portion 48 of the shadow user database 450 can be referred to as being defined in response to the comparison of the original user database 430 with the target upgrade database 425.

As mentioned previously, the shadow user database 450 does not yet include any data. Specifically, the structure V1 of the upgraded portion 46 of the shadow user database 450 does not include data, and the alias portion 48 of the shadow user database 450 also does not include data. The data to be included in the structure V1 of the shadow user database 450 is obtained from the original user database 430, which is specific to the owner of the original system 410. The alias portion 48 of the shadow user database 450 will be linked to the non-modified portion 44 of the original user database 430. The movement of the data 433 and the aliasing of data 437 into the shadow user database 450 is shown and described in connection with FIG. 4C.

Also, as shown in FIG. 4B, the shadow program database 440 is updated with the new support packages not already included in the original program database 420. Specifically, the shadow program database 440 is modified to include a structure X2 and data 448 that correspond with the support packages not already included in the original program database 420. The structure X2 and data 448 can collectively be referred to as a shadow support package portion 28 of the shadow program database 440. In some embodiments, data 448 of the shadow support package portion 28 can be modified with user-specific customizations.

During the portions of the upgrade process shown in FIG. 4B, the shadow system 400 can be in a downstate. Specifically, the shadow user database 450 can be created while the shadow system 400 is in the downstate, and the shadow program database 440 can be modified with a default structure X2 and default data 448 associated with support packages while the shadow system 400 is in the downstate. The original system 410, however, can remain in an upstate (and in uptime) while the original system 410 can be productively used by one or more users during these portions of the upgrade process shown in FIG. 4B. Although not shown, in some embodiments, the original system 410 can be changed from an upstate to a downstate during the portions of the upgrade process described in connection with FIG. 4B.

Figure 4C:
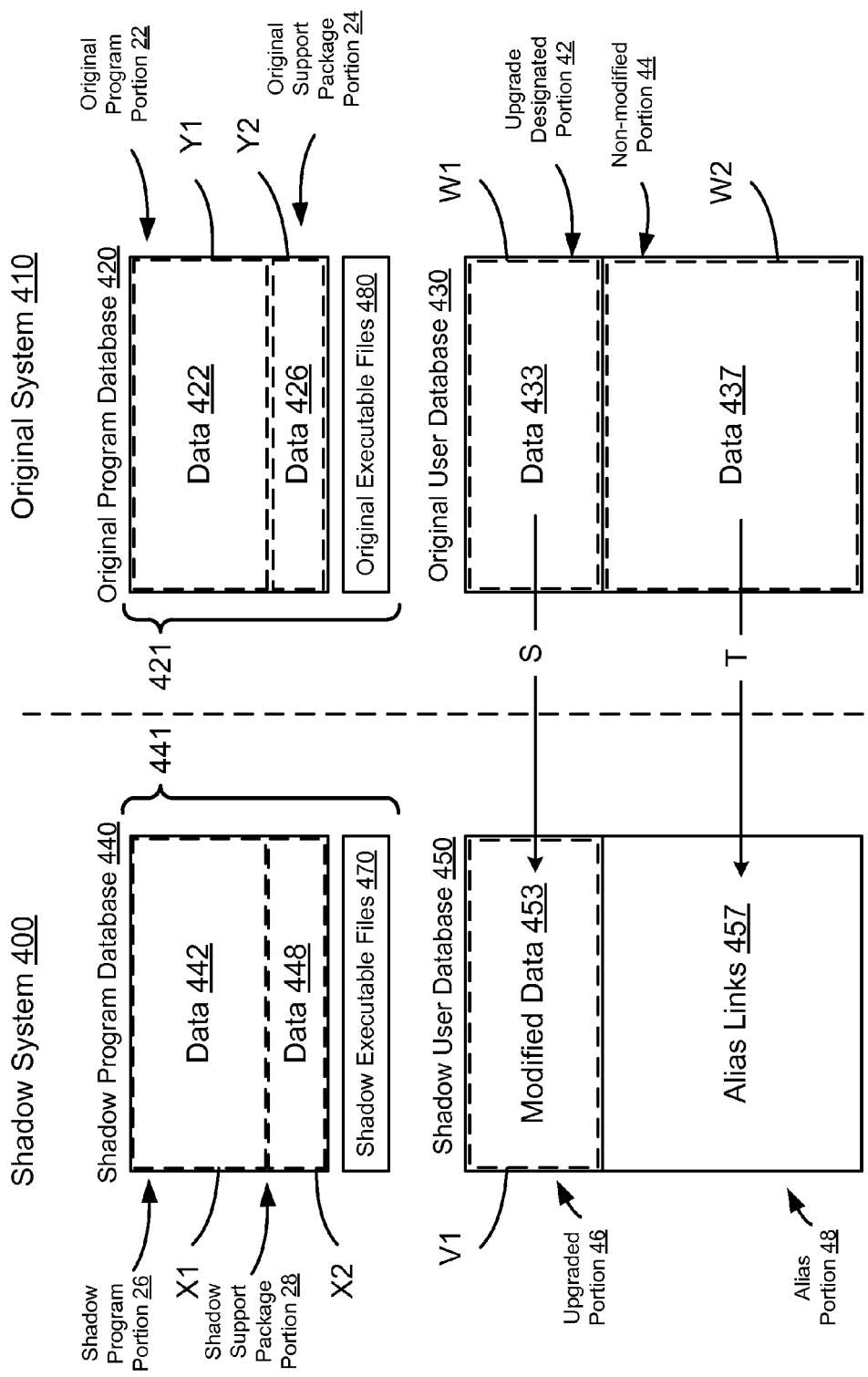
FIG. 4C is a diagram that illustrates modification of data of the shadow system based on data from the original system shown in FIG. 4B.

FIG. 4C is a diagram that illustrates modification of data of the shadow system 400 based on data from the original system 410. Specifically, the data of the original system 410 is imported into the shadow system 400. In some embodiments, the portion of the upgrade process illustrated in FIG. 4C can be referred to as an import stage, or as a data import stage, of the upgrade process. In some embodiments, the shadow program database 440 can represent an upgraded version of the original program database 420 (with new support packages included in the shadow support package portion 28).

As represented by arrow S, data 433 from the upgrade designated portion 42 of the original user database 430 is imported into the structure V1 of the upgraded portion 46 of the shadow user database 450. The data 433 of the original user database 430 is imported into the shadow user database 450 so that the data 433 can be included in the upgraded portion 46 of the shadow user database 450. Because the structure V1 of the shadow user database 450 is different than the structure W1 of the original user database 430 (to which the structure V1 of the shadow user database 450 corresponds), the data 433 is modified when included in the structure V1 of the upgraded portion 46 of the shadow user database 450. Accordingly, the data included in the structure V1 is referred to as modified data 453. In some embodiments, the modified data 453 can be identical to the data 433, but can be modified in form only when included in the structure V1 of the upgraded portion 46 of the shadow user database 450. In some embodiments, the data 433 can be substantively modified (e.g., modified by adding data, modified by removing data) when included in the structure V1 of the upgraded portion 46 of the shadow user database 450 to define the modified data 453.

As represented by arrow T, data 437 from the non-modified portion 44 of the original user database 430 is aliased (but not replicated) within the alias portion 48 of the shadow user database 450 as alias links 457. In other words, the data 437 is referenced within the alias portion 48 via alias links 457. In some embodiments, the data 437 can be aliased within the shadow user database 450 as alias links 457 by a database replicator such as database replicator 166 shown in FIG. 1. Although not shown, in some embodiments, the data 437 can be replicated within the shadow user database 450 as alias data 457 by a database replicator such as database replicator 166 shown in FIG. 1. Although not shown in FIG. 4C, if the entire original user database 430 is designated as a non-modified database (rather than designated partially for upgrade and partially for no modification), data from the entire original user database 430 can be aliased in the shadow user database 450.

Although not shown in FIG. 4C, if the entire original user database 430 is designated for upgrade (rather than designated partially for upgrade and partially for no modification), data from the entire original user database 430 can be modified in substance (e.g., modified by adding data, modified by removing data) and/or modified in form (e.g., modified by rearranging data) when moved into the shadow user database 450. In such embodiments, the modification of the data from the original user database 430 may be necessitated because the structure of the shadow user database 450 may not match the structure of the original user database 430.

Modifying the default data in the shadow system 400 with the data included in the original system 410 can enable defining of the shadow system 400 based on a standard configuration. In other words, the shadow system 400 can be initially created using the default data associated with a base program level and/or support package combination that does not have to be customized to the original system 410. Instead, the customizations implemented by, for example a user and/or an owner of the original system 410 can be used to customize the shadow system 400 so that the shadow system 400 corresponds with the original system 410 with a desirable level of accuracy.

During the modification of data of the shadow system 400 based on data from (e.g., data imported from) the original system 410, the shadow system 400 can be in an upstate and the original system 410 can continue to operate in an upstate (and uptime). In some embodiments, the original system 410 and/or the shadow system 400 can be changed from an upstate to a downstate during the modification of data of the shadow system 400 based on data from (e.g., data imported from) the original system 410.

In some embodiments, during the data import stage of the upgrade process shown in FIG. 4C, the shadow system 400 can be restarted. In some embodiments, certain after import methods (AIMs) and/or execution of programs after import (XPRAs) enabled for (and/or designated for) execution within the shadow system 400 can be executed within the shadow system 400 during the data import stage of the upgrade process. Specifically, import methods designated for execution after the data from the original system 410 has been imported into the shadow system 400 as described in connection with FIG. 4C. In some embodiments, if the shadow system 400 is based on ABAP, certain ABAP loads can be generated within the shadow system 400.

Figure 4D:
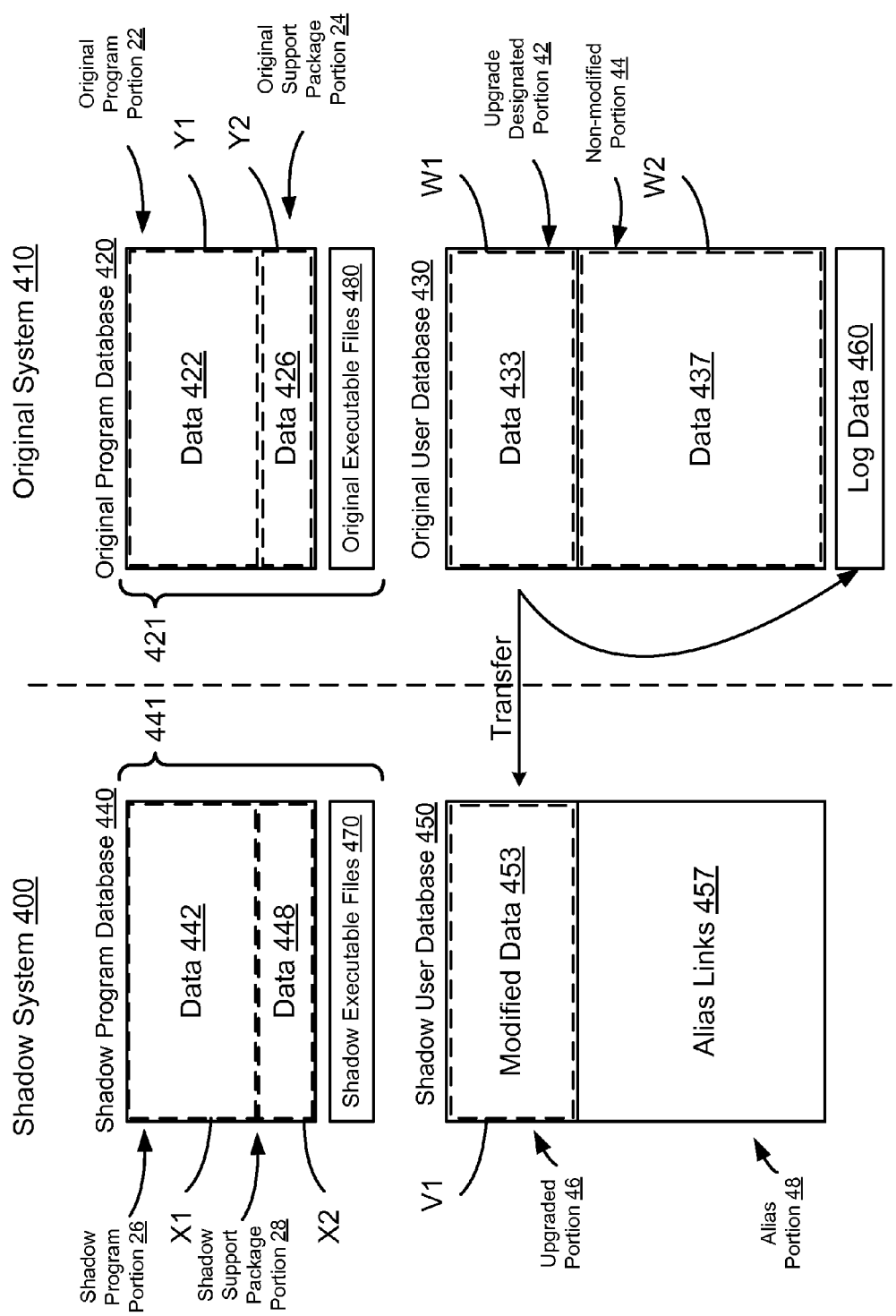
FIG. 4D is a diagram that illustrates transfer of changed data from the original user database to the shadow user database shown in FIG. 4C.

FIG. 4D is a diagram that illustrates transfer of changed data from the original user database 430 to the shadow user database 450 shown in FIG. 4C. In some embodiments, the transfer of changed data from the original user database 430 to the shadow user database 450 can be dynamically performed. In some embodiments, the portion of the upgrade process shown in FIG. 4D can be referred to as the replication stage.

The transfer (e.g., recording) can include transfer of any changes (e.g., deletions, modifications, additions) to the original user database 430 (and/or portions thereof) in the shadow user database 450 (and/or portions thereof). The changes to the original user database 430 can be performed by a user during productive use of the original database 430 (and can be previously recorded changes). In other words, during this stage of the upgrade process the shadow system 400 can operate in parallel with the original system 410 and any changes to the original system 410 can be implemented in the shadow system 400. Said differently, the shadow system 400 can mirror the original system 410 except for differences related to program versions between the shadow system 400 and original system 410.

During the portion of the upgrade process shown in FIG. 4D, the shadow system 400 can be in an upstate, and the original system 410 remain in an upstate (and in uptime). Accordingly, both the shadow system 400 and the original system 410 can be configured to operate in an upstate. The shadow system 400, however, is configured to operate based on an upgraded program version (i.e., program version 6.0 SPG2) of the original program version (i.e., original program version 2.0 SPG2) used by the original system 410. Also, the shadow user database 450 is an upgraded version of the original user database 430. In some embodiments, the shadow system 400 can be maintained in the upstate by a downtime execution module such as downtime execution module 196 shown in FIG. 1.

As shown in FIG. 4D, changes to the original user database 430 that are transferred to (e.g., recorded within) the shadow user database 450 can also be logged as (e.g., stored as) log data 460. For example, a date/time stamp associated with a change that occurred in the original user database 430 can be logged in the log data 460. In some embodiments, the type of change that occurred in the original user database 430 can also be logged in the log data 460. In some embodiments, the transfer of the change in (e.g., transfer of the type of change in, transfer of the modification of) the shadow user database 450 can be logged in the log data 460.

Although not shown in FIG. 4D, in some embodiments, changes to the original program database 420 and/or the original executable files 480 can also be transferred to the shadow system 400. For example, a change to a configuration (e.g., a configuration file) associated with an original executable file 480 in the original system 410 can be transferred to a configuration (e.g., a configuration file) associated with the shadow executable files 470.

In some embodiments, the transfer can include modifying one or more portions of the shadow system 400 based on one or more changes to the original system 410. In some embodiments, the transfer can include dynamically modifying one or more portions of the shadow system 400 based on one more changes to the original system 410. For example, changes to the original system 410 can be transferred to the shadow system 400 in response to changes occurring. In some embodiments, the changes to the original system 410 can be transferred to the shadow system 400, for example, in a batch mode, periodically, based on a schedule, in real-time, and/or so forth.

In some embodiments, during a final portion of the replication stage of the upgrade process shown in FIG. 4D, final changes to original system 410 are transferred to the shadow system 400. In some embodiments, this final portion of the replication stage of the upgrade process can be referred to as final transfer or as a final transfer portion of the replication stage of the upgrade process. During the final transfer (or at the start of the final transfer), the original system 410 can be changed from an uptime (in an upstate) to downtime (while in an upstate). In some embodiments the original system 410 can be changed to a downtime, at least in part, by a downtime execution module such as downtime execution module 196 shown in FIG. 1.

In some embodiments, before the final transfer is initiated, all users can be logged off from the original system 410. The users may be logged off so that final changes to the original system 410 can be transferred to the shadow system 400 without intervening changes disrupting the final transfer of changes.

In some embodiments, before the final transfer is initiated, batch jobs scheduled for execution within the original system 410 can be suspended. In some embodiments, batch jobs may be permanently suspended or may be temporarily suspended. In some embodiments, the batch jobs can include processing of data (e.g., retrieval of data, modification of data) within the original user database 430. After the final transfer, functionality associated with transfer of data from the original system 410 to shadow system 400 can be turned off (e.g., disabled). For example, if transfer of data from the original system 410 to the shadow system 400 is implemented using a database replicator, such as database replicator 166 shown in FIG. 1, the functionality of the database replicator can be turned off.

Figure 4E:
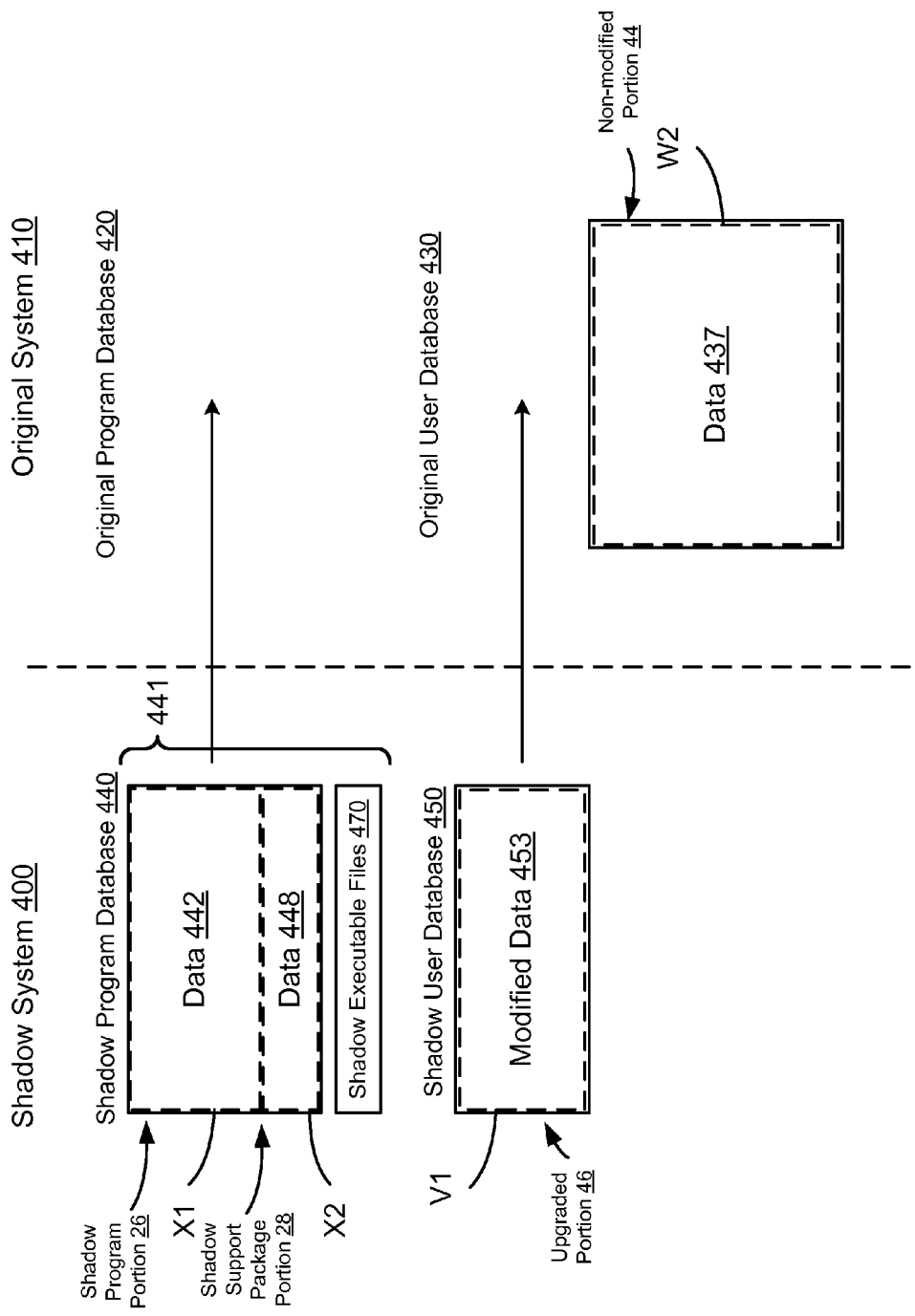
FIG. 4E is a diagram that illustrates replacement of portions of the original system with portions of the shadow system shown in FIG. 4D.

FIG. 4E is a diagram that illustrates replacement of portions of the original system 410 with portions of the shadow system 400 shown in FIG. 4D. In some embodiments, the replacement of portions of the original system 410 with portions of the shadow system 400 can be performed during a portion of the upgrade process referred to as a replacement stage. During the replacement stage, the original system 410 can be in the downstate and the shadow system 400 can be in a dismantled state (e.g., can be removed as a functional system). The original system 410 can be in a downstate (and downtime) so that portions of the original system 410 can be replaced with portions of the shadow system 400.

As shown in FIG. 4E, the original program 421, which includes the original program database 420 and the original executable files 480 (shown in FIG. 4D), are replaced with the shadow program 441, which includes the shadow program database 440 and shadow executable files 470. As indicated previously, the shadow program 441 can be in an upgraded program state. Also, the upgrade designated portion 42 of the original user database 430 (shown in FIG. 4D) can be replaced with the upgraded portion 46 of the shadow user database 450.

As shown in FIG. 4E, the non-modified portion 44 of the original user database 430 may not be replaced with the alias portion 48 of the shadow user database 450 (shown in FIG. 4D). The non-modified portion 44 of the original user database 430 may not be replaced because the non-modified portion 44 can be identical to the alias portion 48 of the shadow user database 450. In some embodiments, the non-modified portion 44 of the original user database 430 can be replaced with the alias portion 48 of the shadow user database 450.

Figure 4F:
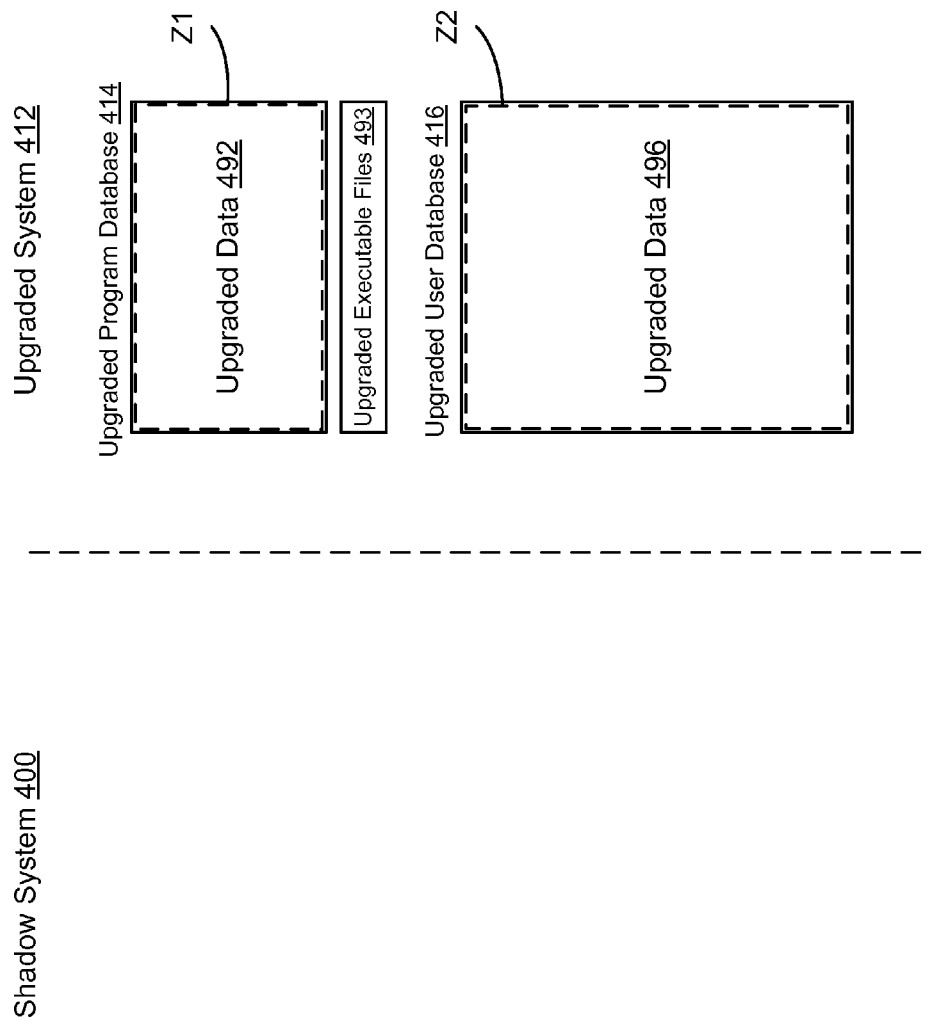
FIG. 4F is a diagram that illustrates an upgraded system after the replacement stage of an upgrade process has been completed.

FIG. 4F is a diagram that illustrates an upgraded system 412 after the replacement stage of an upgrade process has been completed. The upgraded system 412 can be a replaced version of the original system 410 shown in FIG. 4E. The upgraded system 412 can be based on (e.g., entirely based on) the upgraded program version previously manipulated within the shadow system 400.

The upgraded system 412 includes an upgraded program database 414, an upgraded user database 416, and upgraded executable files 493. The upgraded program database 414 includes an upgraded structure Z1 and upgraded data 492 stored within the upgraded structure Z1. In some embodiments, the upgraded program database 414 can include a program portion and a support package portion. The upgraded user database 416 includes an upgraded structure Z2 and upgraded data 496 stored within the upgraded structure Z2.

After the original system 410 has been replaced by the shadow system 402 to define the upgraded system 412, the upgraded system 412 can be changed from a downstate to an upstate. In other words, the upgraded system 412 can be started or restarted (based on program version 6.0 SPG2).

As shown in FIG. 4F, the components of the shadow system 400 have been completely deleted. In some embodiments, certain AIMs and/or XPRAs that were not enabled (and/or designated) for execution within the shadow system 400 can be executed within the upgraded system 412. In some embodiments, the AIMs can be executed within the upgraded system 412 while the upgraded system 412 is in an upstate (but during downtime). In some embodiments, the AIMs and/or XPRAs can be executed during an AIM execution stage of the upgrade process.

In some embodiments, after the AIM execution stage of the upgrade process has been completed a post-upgrade activities stage of the upgrade process can be initiated. During the post-upgrade activity stage, the upgrade system 412 can be unlocked for use by one or more users. In other words, the upgrade system 412 can be triggered to operate in an operational (or active) mode. In some embodiments, during the post-upgrade activity stage, batch jobs previously suspended during the replication stage can be restarted by, for example, an administrator. In some embodiments, after the AIM execution stage of the upgrade process has been completed, a system upgrade module (such as system upgrade module 170 shown in FIG. 1) can be configured to notify, for example, an administrator that post-upgrade activities may be initiated.

In some embodiments, one or more users may be notified using a system upgrade module, such as system upgrade module 170 shown in FIG. 1, that the upgraded system 412 is ready for use in an operational (or active) mode. In some embodiments, one or more users may not be notified until the post-upgrade activity stage has been completed.

Although not shown in FIGS. 4A through 4F, in some embodiments the techniques described herein can be used to upgrade one or more databases without upgrading one or more executable files. For example, the techniques described herein can be used to upgrade an original user database without upgrading an original program database and/or original executable files associated with the original program database. In such embodiments, the portions of the upgrade process associated with upgrading the original program database and/or the original executable files may be omitted. Similarly, the techniques described herein can be used to upgrade the original program database without upgrading a portion of an original user database. In such embodiments, the portions of the upgrade process associated with upgrading the original user database and/or the original executable files may be omitted.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including a processor and instructions stored on a non-transitory computer-readable storage medium, the computer system comprising:
   a database comparator to identify a first portion of an original user database of an original system for upgrade;
   a user database module to define, at a shadow system, a shadow user database having a structure defining an upgrade to a structure of the first portion of the original user database;
   a database replicator to,
      perform at least one first transfer of data from the first portion of the original user database into the structure of the shadow user database during an uptime of the original system,
      record, in a log, changes to data in the original user database corresponding to the at least one first transfer of data from the first portion of the original user database during the uptime of the original system,
      replicate the changes to the data in the structure of the shadow user database during the uptime of the original system,
      identify a second portion of the original user database of the original system for aliasing in the shadow system,
      reference the second portion of the original user database as an alias database on the shadow system during an uptime of the original system, and
      perform a final transfer of data from the first portion of the original user database into the structure of the shadow user database during a downtime of the original system; and
   an upgrade transfer module to
      replace the first portion of the original user database with the shadow user database after the final transfer of data has been performed, and
      remove the alias database during a downtime of the original system.

2. The computer system of claim 1, wherein the database comparator identifies the first portion of the original user database of the original system for upgrade based on a comparison of the first portion of the original user database with a target user database associated with the shadow user database.

3. The computer system of claim 1, wherein
   the shadow user database is defined during an uptime of the original system, and
   data of a shadow program database is selected during the uptime of the original system.

4. The computer system of claim 1, wherein
   the shadow user database is defined during an uptime of the original system,
   data of a shadow program database is selected during the uptime of the original system, and
   the database replicator transfers data from the first portion of the original user database into the structure of the shadow user database while the shadow system is in an upstate.

5. The computer system of claim 1, further comprising:
   a downtime execution module to suspend a batch job of the original system and to log-off a user from the original system before a downtime of the original system is initiated, wherein
   the database replicator performs a final transfer of data from the first portion of the original user database into the structure of the shadow user database after the downtime of the original system is initiated.

6. The computer system of claim 1, wherein
   the database replicator logs changes to the data in the structure of the shadow user database during an uptime of the shadow system, the upstate of the shadow system overlapping with an uptime of the original system.

7. The computer system of claim 1, wherein
   the shadow system operates within hardware of the original system, and
   the upgrade transfer module dismantles the shadow system from the hardware of the original system before the original user database and an original program database have been replaced.

8. The computer system of claim 1, wherein
   the shadow system includes a set of upgrade executable files associated with a structure of a shadow program database and data of the shadow program database, the original system includes a set of original executable files,
   the computer system further comprising:
   an executable upgrade module to replace the set of original executable files included in the original system with the set of upgrade executable files included in the shadow system during a downtime of the original system.

9. The computer system of claim 1, wherein a combination of a default shadow program database and a support package program database correspond with the structure of the shadow program database and the data of the shadow program database.

10. The computer system of claim 1, wherein
    the shadow system includes a shadow program database having a structure defining an upgrade to a structure of an original program database on an original system, and having data defining an upgrade to data of the original program database on the original system, and
    the structure of the shadow program database is defined by a plurality of tables and the data of the shadow program database includes a plurality of program instructions stored within the plurality of tables, the shadow system includes a set of upgrade executable files to access the plurality of program instructions from the plurality of tables.

11. The computer system of claim 1, wherein
the upgrade transfer module changes a state of the original system from uptime to downtime during a replication stage of an upgrade process,
the database replicator performs an initial transfer of data from the first portion of the original user database into the structure of the shadow user database during productive use of the original system and before the replication stage of the upgrade process is initiated.

12. A non-transitory computer-readable storage medium storing code representing instructions that when executed, by a processor, cause the processor to perform a process, the code comprising code to:
identify a first portion of an original user database of an original system for upgrade;
define, at a shadow system, a shadow user database having a structure representing an upgrade to a structure of the first portion of the original user database;
perform at least one first transfer of data from the first portion of the original user database into the structure of the shadow user database during an uptime of the original system;
record, in a log, changes to data in the original user database corresponding to the at least one first transfer of data from the first portion of the original user database during the uptime of the original system;
replicate the changes to the data in the structure of the shadow user database during the uptime of the original system;
identify a second portion of the original user database of the original system for aliasing in the shadow system;
reference the second portion of the original user database as an alias database at the shadow system during an uptime of the original system;
perform a final transfer of data from the first portion of the original user database into the structure of the shadow user database during a downtime of the original system;
replace the first portion of the original user database with the shadow user database after the final transfer of data has been performed; and
remove the alias database during a downtime of the original system.

13. The non-transitory computer-readable storage medium of claim 12, further comprising code to:
identify the first portion of the original user database of the original system for upgrade based on a comparison of the first portion of the original user database with a target user database associated with a shadow program database.

14. The non-transitory computer-readable storage medium of claim 12, wherein
the shadow user database is defined during an uptime of the original system, and
the data of a shadow program database is selected during the uptime of the original system.

15. A method including executing instructions recorded on a non-transitory computer-readable storage media using at least one processor, the method comprising:
identifying a first portion of an original user database of an original system for upgrade;
defining, at a shadow system, a shadow user database having a structure representing an upgrade to a structure of the first portion of the original user database;
performing, at the shadow system, at least one first transfer of data from the first portion of the original user database into the structure of the shadow user database during an uptime of the original system;
recording, in a log, changes to data in the original user database corresponding to the at least one first transfer of data from the first portion of the original user database during the uptime of the original system;
replicating the changes to the data in the structure of the shadow user database during the uptime of the original system;
identifying a second portion of the original user database of the original system for aliasing in the shadow system;
referencing the second portion of the original user database as an alias database at the shadow system during an uptime of the original system;
performing, at the shadow system, a final transfer of data from the first portion of the original user database into the structure of the shadow user database during a downtime of the original system;
replacing the first portion of the original user database with the shadow user database after the final transfer of data has been performed; and
removing the alias database during a downtime of the original system.

16. The method of claim 15, further comprising:
identifying the first portion of the original user database of the original system for upgrade based on a comparison of the first portion of the original user database with a target user database associated with a shadow program database.

17. The method of claim 15, wherein the shadow user database is defined during an uptime of the original system, and data of a shadow program database is selected during the uptime of the original system.

* * * * *